Patented Jan. 7, 1947

2,413,790

UNITED STATES PATENT OFFICE 2,413,790

DYESTUFF INTERMEDIATES

George W. Seymour, Victor S. Salvin, and Maurice E. Miville, Cumberland, Md., assignors to Celanese Corporation of America, a corporation of Delaware No Drawing. Application February 5, 1944, Serial No. 521,275

4 Claims. (Cl. 260—371)

This invention relates to dyestuff intermediates, and relates more particularly to an improved process for the production of 1-amino-2-sulpho-4-brom-anthraquinone, which compound is a valuable intermediate for the preparation of certain anthraquinone dyestuffs.

An object of this invention is the provision of an improved process for the production of 1-amino-2-sulpho-4-brom-anthraquinone wherein said intermediate may be obtained in a satisfactory purity and improved yield.

Other objects of this invention will appear hereinafter from the following detailed description.

The dyestuff intermediate 1-amino-2-sulpho-4-brom-anthraquinone finds important use as raw material in the preparation of valuable dyestuffs for cellulose acetate and other organic derivative of cellulose materials. This intermediate is usually prepared by sulphonating 1-amino-anthraquinone to yield 1-amino-2-sulpho-anthraquinone, which compound is then isolated from the sulphonation mixture, freed of impurities and then brominated. The isolation of the 1-amino-2-sulpho-anthraquinone is a troublesome procedure involving a hot digestion and slow filtration of the product. Moreover, since the 1-amino-2-sulpho-anthraquinone is water-soluble, there is an appreciable loss of the latter in the filtrate despite the fact that the usual precautions are taken to minimize this loss.

We have now discovered that the valuable 1-amino-2-sulpho-4-brom-anthraquinone can be prepared in an economical and efficient manner with yields far greater than that hitherto achieved. In accordance with the process of our invention, this substantial advantage is achieved if, following sulphonation of the 1-amino-anthraquinone, the sulphonation mixture is cooled, suspended in water by salting out and the suspension obtained is then brominated directly without attempting to isolate the 1-amino-2-sulpho-anthraquinone from the sulphonation mixture and to free it of isomers, unsulphonated product and like impurities prior to bromination. Our improved process not only eliminates the initial separation of the 1-amino-2-sulpho-anthraquinone prior to bromination but results in yields of 1-amino-2-sulpho-4-brom-anthraquinone which are substantially above those heretofore achieved with the processes of the prior art. The 1-amino-2-sulpho-4-brom anthraquinone obtained may be reacted by processes well known in the art with aniline, n-butylamine, methylamine or other organic amine whereby the bromine radical in the 4-position is replaced by a substituted amino group, and valuable dyestuffs for cellulose acetate or other organic derivative of cellulose materials may be obtained. The dyestuffs obtained are of excellent color value despite the fact that no attempt was made to purify the 1-amino-2-sulpho-anthraquinone and to remove those impurities which might tend to impair the color value of the dyestuffs formed from the brominated intermediate. This result is, of course, quite surprising and contrary to the teaching of the art which regarded the intermediate separation, isolation and purification of the 1-amino-2-sulpho-anthraquinone as essential if the 1-amino-2-sulpho-4-brom-anthraquinone obtained on bromination of the former were to be of any value whatever as an intermediate in dyestuff preparation.

In order further to illustrate our invention but without being limited thereto, the following example is given:

Example 206 parts by weight of 20% oleum and 43 parts by weight of 98% sulphuric acid are placed in a sulphonation pot and 60 parts by weight of anhydrous sodium sulphate are added gradually. The temperature rises slowly to 70° C. 20 parts by weight of 1-amino-anthraquinone are slowly added to the mixture in the sulphonation pot and the temperature is raised to 80° C. for one hour, and is then raised to 120° C. and maintained at this temperature for five hours.

The sulphonation melt is allowed to cool and is then poured into 1,000 parts by weight of ice and water. 100 parts by weight of sodium chloride are added with stirring and the 1-amino-2-sulpho-anthraquinone is salted out of solution. The suspension obtained is cooled to $-5°$ to $0°$ C. and a solution comprising 15.6 parts by weight of bromine in 80 parts by weight of water and 75 parts by weight of 35% hydrochloric acid are added slowly with stirring over a period of four hours, the temperature being kept at $-5°$ to $0°$ C. throughout that period. The mixture is stirred for one hour after all the bromine has been added, during which time bromination is completed. The 1-amino-2-sulpho-4-brom-anthraquinone formed separates out in the form of red crystals and is filtered from solution. The filter cake obtained on filtration is digested at 80 to 90° C. in 1,500 parts by weight of water for 30 minutes and the hot solution is then filtered to remove all water-insoluble impurities. To the hot filtered solution are added 225 parts by weight of common salt and the whole cooled to 15 to 20° C. whereupon the 1-amino-2-sulpho-4-brom-anthraquinone separates out. The product is filtered, and then washed with 12% brine. The yield is 70% of theoretical. Where the 1-amino-2-sulpho-anthraquinone is isolated, digested and purified before bromination, the overall yield is only 50 to 55%.

It is to be understood that the foregoing detailed description is given merely by way of illustration and that many variations may be made therein without departing from the spirit of our invention.

Having described our invention, what we desire to secure by Letters Patent is:

1. Process for the production of 1-amino-2-sulpho-4-brom-anthraquinone, which comprises sulphonating 1-amino-anthraquinone, adding the sulphonation mixture to water, salting out the sulphonated anthraquinone product, brominating directly the resulting sulphonated anthraquinone product, and separating 1-amino-2-sulpho-4-brom-anthraquinone from the reaction mixture.

2. Process for the production of 1-amino-2-sulpho-4-brom-anthraquinone, which comprises sulphonating 1-amino-anthraquinone, adding the sulphonation mixture to water, salting out the sulphonated anthraquinone product, brominating directly the resulting sulphonated anthraquinone product, separating 1-amino-2-sulpho-4-brom-anthraquinone from the reaction mixture, and recrystallizing the 1-amino-2-sulpho-4-brom-anthraquinone.

3. Process for the production of 1-amino-2-sulpho-4-brom-anthraquinone, which comprises sulphonating 1-amino-anthraquinone, adding the sulphonation mixture to water, salting out the sulphonated anthraquinone product from solution of addition of sodium chloride whereby a suspension of the sulphonated anthraquinone product in water is obtained, brominating directly the suspended anthraquinone product, and separating 1-amino-2-sulpho-4-brom-anthraquinone from the reaction mixture.

4. Process for the production of 1-amino-2-sulpho-4-brom anthraquinone, which comprises sulphonating 1-amino-anthraquinone, adding the sulphonation mixture to water, salting out the sulphonated anthraquinone product from solution whereby a suspension of the latter in water is obtained, adding an aqueous solution comprising bromine and hydrochloric acid to the suspension to brominate directly the suspended sulphonated anthraquinone product, and separating 1-amino-2-sulpho-4-brom-anthraquinone from the reaction mixture.

GEORGE W. SEYMOUR.
VICTOR S. SALVIN.
MAURICE E. MIVILLE.